(12) United States Patent
Chen et al.

(10) Patent No.: US 8,179,448 B2
(45) Date of Patent: May 15, 2012

(54) AUTO DEPTH FIELD CAPTURING SYSTEM AND METHOD THEREOF

(75) Inventors: Liang-Gee Chen, Taipei (TW); Wan-Yu Chen, Taipei (TW); Yu-Lin Chang, Taipei (TW); Chao-Chung Cheng, Taipei (TW)

(73) Assignee: National Taiwan University, Taipei (TW)

( * ) Notice: Subject to any disclaimer, the term of this patent is extended or adjusted under 35 U.S.C. 154(b) by 898 days.

(21) Appl. No.: 12/230,200

(22) Filed: Aug. 26, 2008

(65) Prior Publication Data

US 2010/0053416 A1    Mar. 4, 2010

(51) Int. Cl.
*H04N 5/228*    (2006.01)
(52) U.S. Cl. .................... 348/222.1; 348/50; 382/154
(58) Field of Classification Search ............... 348/222.1, 348/175, 180, 50, 42, 46, 49; 382/154, 291; 375/240.01
See application file for complete search history.

(56) References Cited

U.S. PATENT DOCUMENTS

| | | | | |
|---|---|---|---|---|
| 6,144,761 A * | 11/2000 | Kaneko et al. | ................ | 382/154 |
| 6,363,169 B1 * | 3/2002 | Ritter et al. | ................ | 382/154 |
| 6,724,930 B1 * | 4/2004 | Kosaka et al. | ................ | 382/154 |
| 6,771,810 B1 * | 8/2004 | Zhang et al. | ................ | 382/154 |
| 6,781,618 B2 * | 8/2004 | Beardsley | ................ | 348/43 |
| 6,959,253 B2 * | 10/2005 | Jackson et al. | ................ | 702/94 |
| 6,973,202 B2 * | 12/2005 | Mostafavi | ................ | 382/103 |
| 6,977,674 B2 * | 12/2005 | Seo | ................ | 348/207.99 |
| 7,456,842 B2 * | 11/2008 | Kosolapov | ................ | 345/589 |
| 7,676,079 B2 * | 3/2010 | Uchiyama et al. | ................ | 382/154 |
| 7,912,673 B2 * | 3/2011 | Hebert et al. | ................ | 702/153 |
| 2010/0053416 A1 * | 3/2010 | Chen et al. | ................ | 348/345 |
| 2011/0023066 A1 * | 1/2011 | Jang et al. | ................ | 725/54 |

* cited by examiner

*Primary Examiner* — Aung S Moe
(74) *Attorney, Agent, or Firm* — Bacon & Thomas, PLLC (57) ABSTRACT

The invention presents a system and method for obtaining object depth through digital signal processing. The auto depth-field capturing method for a camera includes the steps of a) taking plural images; b) estimating plural epipolar data of the plural images for obtaining a matrix describing motion and directional vectors; c) estimating a location data in response to the plural epipolar data and the matrix; d) rectifying the plural images corresponding to the plural epipolar data for obtaining plural rectified images; e) calculating the location data for obtaining disparity vectors of the rectified images; f) obtaining a depth map in response to the disparity vectors and the location data; and g) painting a 3D image in correspondence with the depth map. The depth estimation method of the present invention is fully automatic without change of the camera itself.

20 Claims, 6 Drawing Sheets

AUTO DEPTH FIELD CAPTURING SYSTEM AND METHOD THEREOF

FIELD OF THE INVENTION

The present invention relates to an image capturing system, and more particularly, to an auto depth field capturing system for a camera and a method thereof.

BACKGROUND OF THE INVENTION

The television has been developed from the beginning of 20th century, wherein the black and white one, the color one, and even the digital television were disclosed for continuously progresses. Human beings keep challenging to improve the science and technology for developing the better vision. In 21st century, people still strive for developing new displaying technique, wherein the new generation displayer could provide more colorful and finer vision.

According to the prior art, the display, such as CRT TV, PC monitor, LCD TV, and PDP TV, is based on 2-D displaying technique. However, the human vision is based on stereoscopy. For achieving the purpose of stereoscopy, it is important to estimate the depth of objects while the stereo image is taken by a camera. For solving the above problem, U.S. Pat. No. 6,959,253 described a method for calibrating machine vision measuring systems that have more than one camera. Furthermore, U.S. Pat. No. 6,781,618 discloses a method consisting of the construction of a 3D scene model by acquiring first images of a scene having unknown characteristics with a first camera. Corresponding second images of another scene having known characteristics are acquired by a second camera. The first and second cameras have a fixed physical relationship to each other. The 3D model should be analyzed by means of using the corresponding positions and the fixed physical relationship of two cameras.

Figure 1:
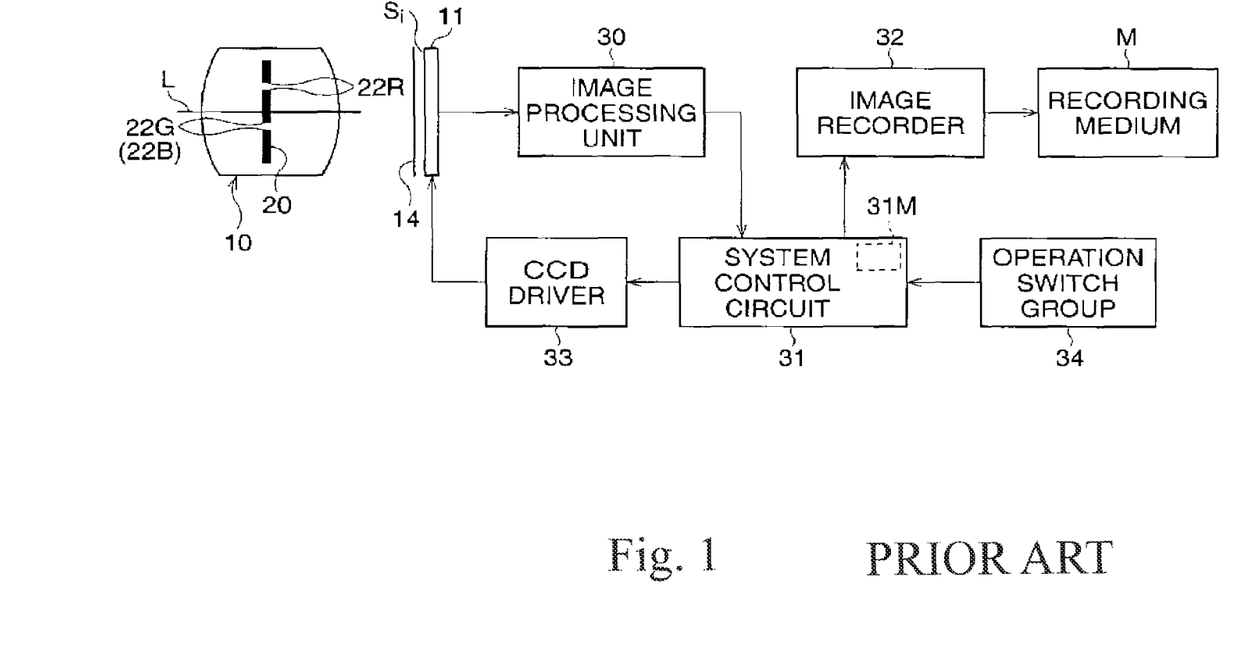
FIG. 1 illustrates a block diagram showing the electrical construction of the stereo-image capturing device according to the prior art.

Please refer to FIG. 1. It illustrates a block diagram showing the electrical construction of the stereo-image capturing device of U.S. Pat. No. 6,977,674. As shown in FIG. 1, a CCD with the RGB on-chip color filter 14 attached is utilized for the imaging device 11. Namely, the color filters which are applied to the apertures 22R, 22G, and 22B correspond to the color filters which are utilized for the imaging device 11. Image signals which are detected in the imaging device (CCD) 11 are fed to the image processing unit 30, so that the signals are converted from analog signals to digital signals and then subjected to predetermined signal processing. An image capturing operation of the stereo-image capturing device and an image data recording operation for the recording medium M are controlled in accordance with the operations at the operation switch group 34. Although there is merely one camera lens introduced for capturing stereo image, the camera lens should be designed in a specific and complex shape and further performed with a lot of limited devices.

The above-mentioned apparatus are performed for capturing stereo image by means of using several calibrated lens, wherein the apparatus are larger and more complicated. Therefore, image-calibrating is considered to achieve the purpose of 3D image reconstruction. The 3D image reconstruction method includes the steps of registering an orthographic image of a scene, combining a photogrammetric image and a technical drawing of the scene to form a co-registered orthographic and perspective (COP) image, and reconstructing a 3D image from the COP image. However, the photogrammetric image should be taken by several cameras at first.

Figure 2:
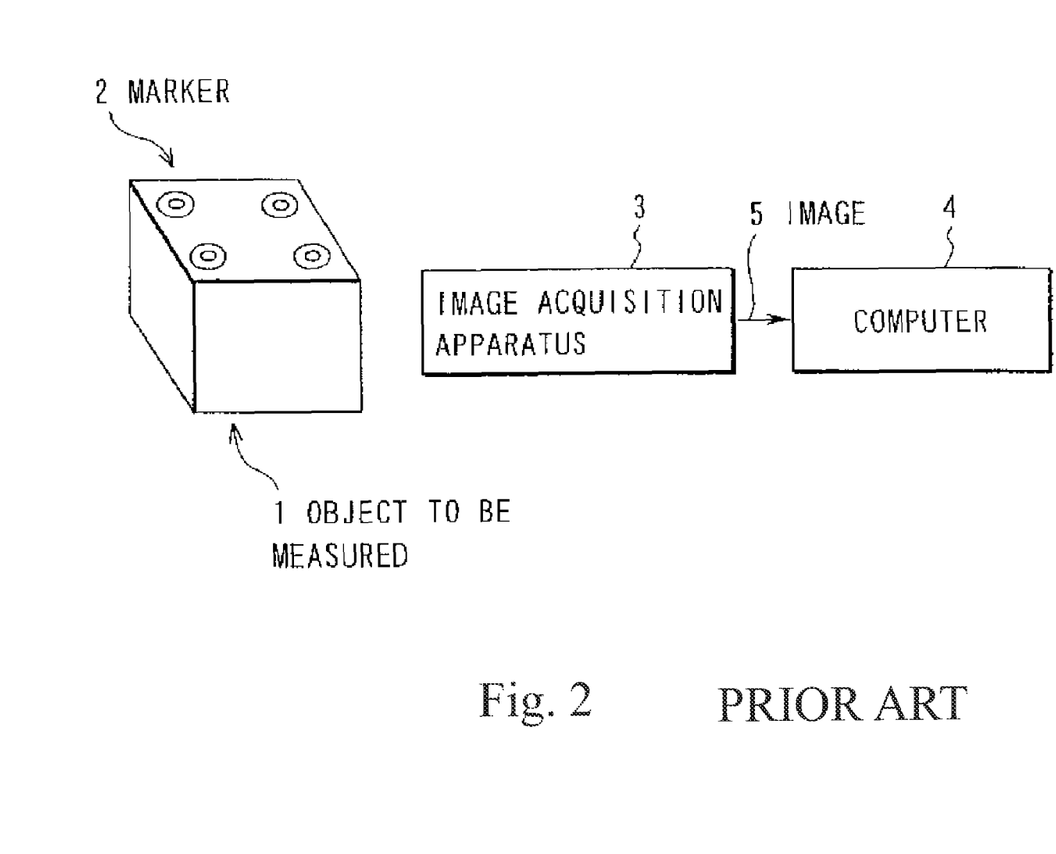
FIG. 2 illustrates a block diagram for showing a structure of a three-dimensional position and orientation sensing apparatus according to the prior art.

In U.S. Pat. No. 6,724,930, it discloses a three-dimensional position and orientation sensing apparatus. Please refer to FIG. 2. It illustrates a block diagram for showing a structure of a three-dimensional position and orientation sensing apparatus according to U.S. Pat. No. 6,724,930. As illustrated in FIG. 2, a plurality of markers 2 (hereinafter to be abbreviated as code markers) having unique geometric characteristics are disposed on or near an object of which three-dimensional position and orientation is to be estimated. These code markers 2 are photographed by an image acquisition apparatus 3, and a photographed image 5 is transferred to within a computer 4. In principle, the object 1 and the image acquisition apparatus 3 have their own coordinate systems, and the image 5 acquired by the image acquisition apparatus 3 is defined as a camera image plane. However, the image 5 should be further dealt by the computer. After the computer 4 has received the image 5, the computer 4 extracts a candidate region that is estimated to be a region corresponding to the code marker 2, from within the image 5. The computer 4 analyzes in detail the candidate region extracted, and then computes geometric characteristics corresponding to the code of the code marker 2 from the candidate region. When the code has been recognized, the computer registers the position within the image and the code by recognizing this region as the marker region. Finally, the computer 4 calculates a three-dimensional position and orientation of the object 1 with respect to the image acquisition apparatus 3, by utilizing the two-dimensional image position of the code marker 2 extracted from the image registered at the step 2 and the three-dimensional position of this code marker 2 with respect to the object 1. Meanwhile there is a lot of operation introduced in computer analyzing.

However, in practice, the prior art should perform 3D depth-capturing by means of introducing more than one camera, a lot of complex calibrated lens or a lot of program operation of computer. It is difficult to implement. Hence, it needs to provide a system and method for obtaining object depth through digital signal processing, which provides disparity vectors and camera extrinsic parameters for obtaining the depth is obtained from a disparity to depth conversion module, simplifies the entire structure and process, is capable of achieving the purpose of automatically obtaining object depth without change of the camera itself, thereby facilitating user to take stereo image, and can rectify those drawbacks of the prior art and solve the above problems.

SUMMARY OF THE INVENTION

This paragraph extracts and compiles some features of the present invention; other features will be disclosed in the follow-up paragraph. It is intended to cover various modifications and similar arrangements included within the spirit and scope of the appended claims, and this paragraph also is considered to refer.

Accordingly, the prior art is limited by the above problems. It is an object of the present invention to provide an auto depth-of-field capturing system of a camera for obtaining object depth through digital signal processing, which provides disparity vectors and camera extrinsic parameters for obtaining the depth is obtained from a disparity to depth conversion module, simplifies the entire structure and process, is capable of achieving the purpose of automatically obtaining object depth without change of the camera itself, thereby facilitating user to take stereo image, and can rectify those drawbacks of the prior art and solve the above problems.

In accordance with an aspect of the present invention, the auto depth-field capturing system for a camera includes a camera lens for taking plural images; a camera calibration device including an epipolar estimation module for estimating plural epipolar data of the plural images; and a camera extrinsic parameter estimation module for estimating a location data; at least a frame buffer for storing the plural images temporarily; an image rectification module for rectifying the plural images corresponding to plural epipolar data and obtaining plural rectified images; a disparity estimation module connected with the camera calibration device and the image rectification module for receiving the location data and obtaining disparity vectors of the rectified images; a disparity to depth conversion module for obtaining a depth in response to the disparity vectors and the location data; and a depth image painting module for painting a 3D image in correspondence with the depth.

Certainly, the plural images can be taken from the camera at different positions.

Preferably, the plural epipolar data are plural epipolar lines and epipolar points.

Preferably, the epipolar estimation module further produces a matrix in response to the plural epipolar lines and epipolar points by means of tracing algorithm.

Preferably, the matrix includes a relative motion vector and a relative direction vector between at least two of the plural images.

Preferably, the location data is the 3D position and angle of the camera.

It is another object of the present invention to provide an auto depth-field capturing method for obtaining object depth through digital signal processing, which provides disparity vectors and camera extrinsic parameters for obtaining the depth through a disparity to depth conversion module and simplifies the entire structure and process. It is capable of achieving the purpose of automatically obtaining object depth without change of the camera itself, thereby facilitating user to take stereo image, and can rectify those drawbacks of the prior art and solve the above problems.

In accordance with the aspect of the present invention, the auto depth-field capturing method for a camera includes the steps of a) taking plural images; b) estimating plural epipolar data of the plural images for obtaining a matrix; c) estimating a location data in response to the plural epipolar data and the matrix; d) rectifying the plural images corresponding to plural epipolar data for obtaining plural rectified images; e) calculating the location data for obtaining disparity vectors of the rectified images; f) obtaining a depth field in response to the disparity vectors and the location data; and g) painting a 3D image in correspondence with the depth field.

Preferably, the step a) is executed via a camera lens.

Preferably, the plural images are taken from the camera at different positions.

Preferably, the step b) is executed via an epipolar estimation module.

Preferably, the plural epipolar data are plural epipolar lines and epipolar points of the plural images.

Preferably, the fundamental matrix is obtained in response to the plural epipolar lines and epipolar points by means of tracing algorithm.

Preferably, the fundamental matrix comprises a relative motion vector and a relative direction vector between at least two of the plural images.

Preferably, the step c) is executed via a camera extrinsic parameter estimation module.

Preferably, the location data is the 3D position and angle of the camera.

Preferably, the step d) is executed via an image rectification module.

Preferably, the step e) is executed via a disparity estimation module.

Preferably, the step f) is executed via a disparity to depth conversion module.

Preferably, the step g) is executed via a depth image painting module.

Preferably, the auto-depth-field capturing method further includes a step of b1) providing at least a frame buffer for storing the plural images temporarily.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention discloses a system and method for obtaining object depth through digital signal processing, and the objects and advantages of the present invention will become more readily apparent to those ordinarily skilled in the art after reviewing the following detailed description. The present invention needs not be limited to the following embodiment.

Figure 3:
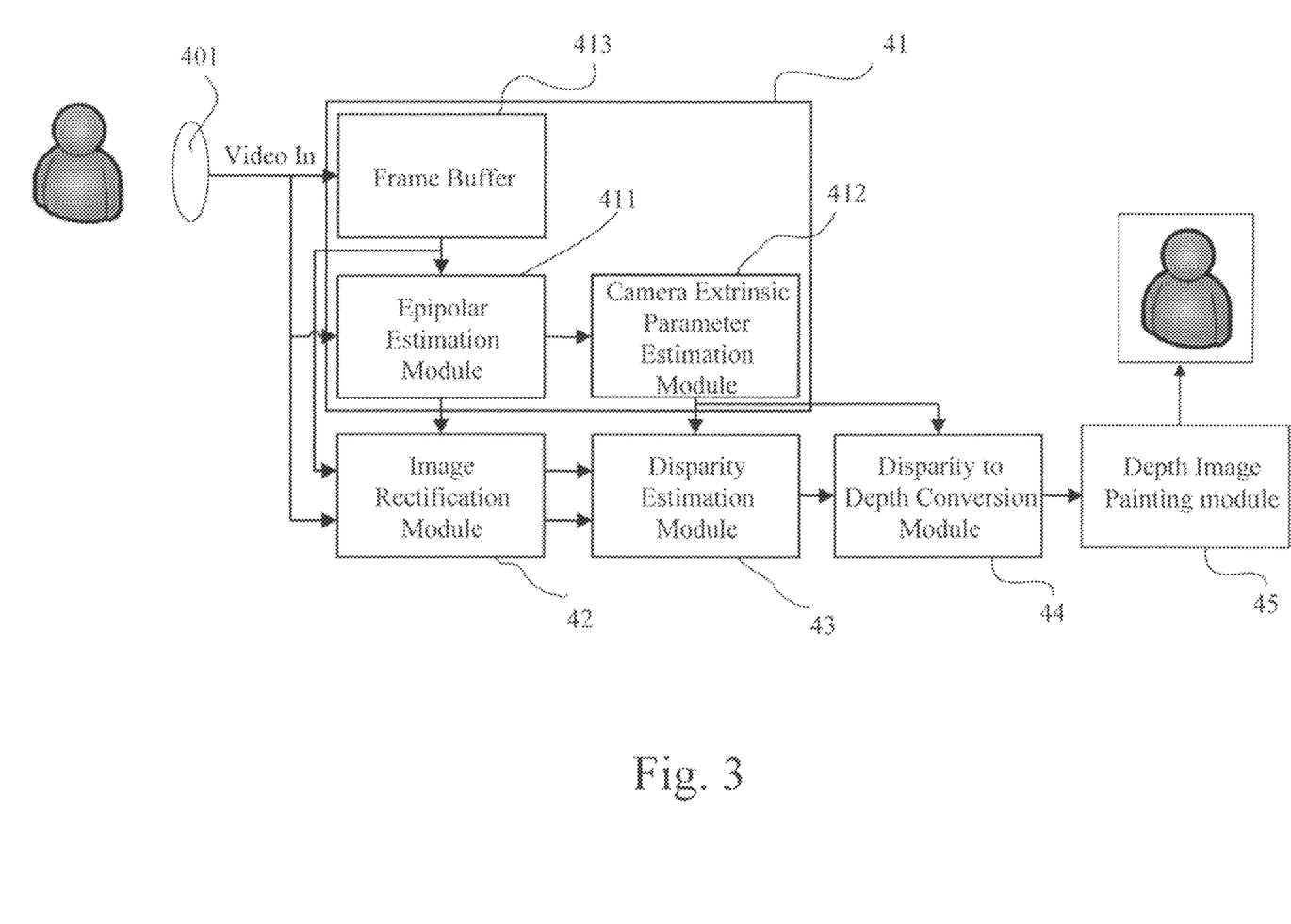
FIG. 3 illustrates an auto depth-field capturing system for a camera according to the present invention.

Please refer to FIG. 3. It illustrates an auto depth-field capturing system for a camera according to the present invention. As shown in FIG. 3, the capturing system of the present invention includes a camera lens 401 for taking plural images; a camera calibration device 41 including an epipolar estimation module 411 for estimating plural epipolar data of the plural images; and a camera extrinsic parameter estimation module 412 for estimating a location data; at least a frame buffer 413 for storing the plural images temporarily; an image rectification module 42 for rectifying the plural images corresponding to plural epipolar data and obtaining plural rectified images; a disparity estimation module 43 connected with the camera calibration device 41 and the image rectification module 42 for receiving the location data and obtaining disparity vectors of the rectified images; a disparity to depth conversion module 44 for obtaining a depth field in response to the disparity vectors and the location data; and a depth image painting module 45 for painting a 3D image in correspondence with the depth field.

In practice, the plural images are taken from the camera at different positions respectively. After at least two images are taken via the camera lens 401, the image will be stored into the frame buffer 413 temporarily. The images stored in the images buffer 413 are introduced to the epipolar estimation module 411 of the camera calibration device 41 in turn. In this embodiment, the plural epipolar data are plural epipolar lines and epipolar points. The epipolar estimation module 411 produces a matrix, such as the matrix consisting of the rotation matrix R and translation matrix t in the following equation $$\begin{bmatrix} u \\ v \\ 1 \end{bmatrix} = \begin{bmatrix} f_u & s & c_x \\ 0 & f_v & c_y \\ 0 & 0 & 1 \end{bmatrix} \begin{bmatrix} 1 & 0 & 0 & 0 \\ 0 & 1 & 0 & 0 \\ 0 & 0 & 1 & 0 \end{bmatrix} \begin{bmatrix} R^T & -R^t t \\ 0_3^T & 1 \end{bmatrix} \begin{bmatrix} X \\ Y \\ Z \\ 1 \end{bmatrix}$$

in response to the plural epipolar lines and epipolar points by means of tracing algorithm, where the matrix includes a relative motion vector and a relative direction vector between at least two of the plural images. For example, the fundamental matrix could be used as the matrix and described as: $F \sim K_2^{-1} E K_1^{-1}$, where $K_1$ and $K_2$ are camera parameters of two images taken in different angles. For real-time operation, plural epipolar lines should be obtained via global estimation and then the matrix is obtained. Thus, the efficiency is increasing. The obtained matrix will be transmitted to the camera extrinsic parameter estimation module 412.

After receiving the plural epipolar lines and the matrix, the camera extrinsic parameter estimation module 412 could produce the location data of the camera, wherein the location data is 3D position and angle of the camera, and is relative to the origin of the previous image. The location data is supplied for a disparity estimation module 43 and a disparity to depth conversion module 44.

The image rectification module 42 rectifies the plural images corresponding to plural epipolar data and at least two images, and obtains plural rectified images, wherein epipolar lines of two images are rectified into the same one; and one center, called capturing-image center, is given for the removed two images. The rectified images and the location data of the camera extrinsic parameter estimation module 412 are inputted to the disparity estimation module 43. In the present invention, the epipolar estimation module 411, the camera extrinsic parameter estimation module 412, and the frame buffer 413 could be integrated in a camera calibration device 41, which is a part of an IC device at small size, instead of introducing a large computer.

After the disparity estimation module 43 receives the rectified images and the location data of the camera extrinsic parameter estimation module 412, the disparity vectors are produced to transmit to the disparity to depth conversion module 44. The disparity to depth conversion module 44 will produce a depth in response to the disparity vectors and the location data, and then a depth image painting module 45 is able to paint a 3D image in correspondence with the depth.

Figure 4:
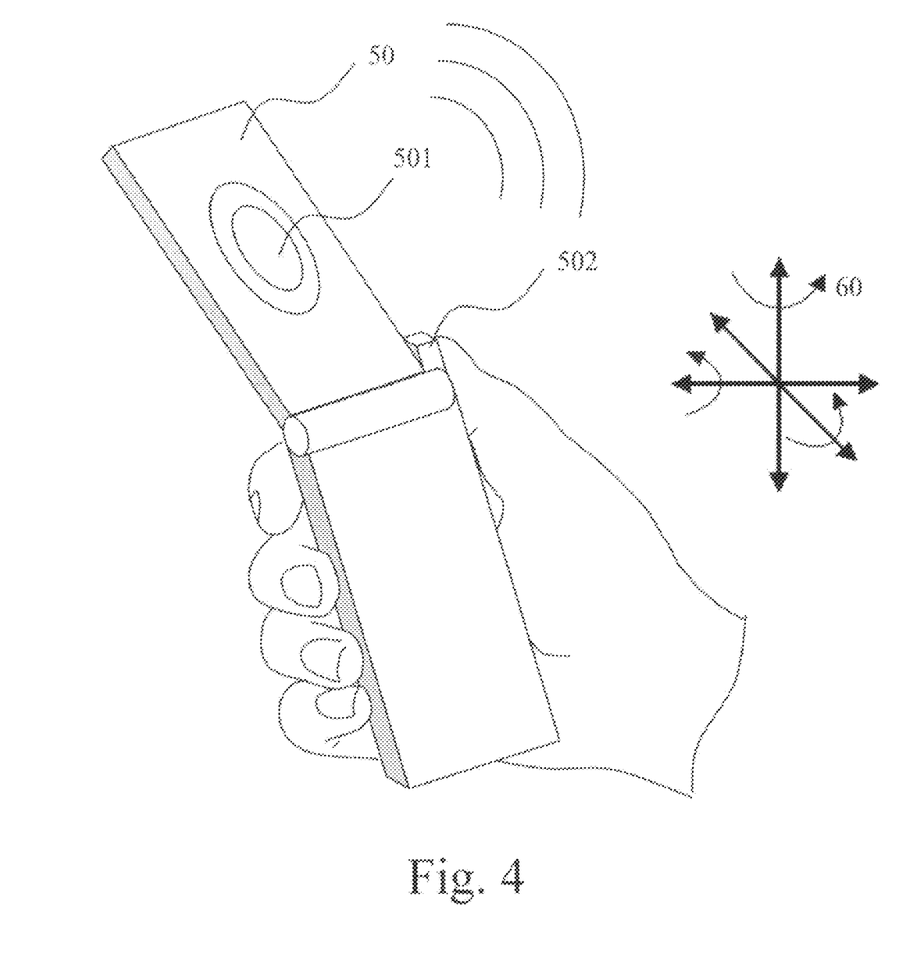
FIG. 4 illustrates a camera for an auto depth-field capturing system according to the present invention.
Figure 5:
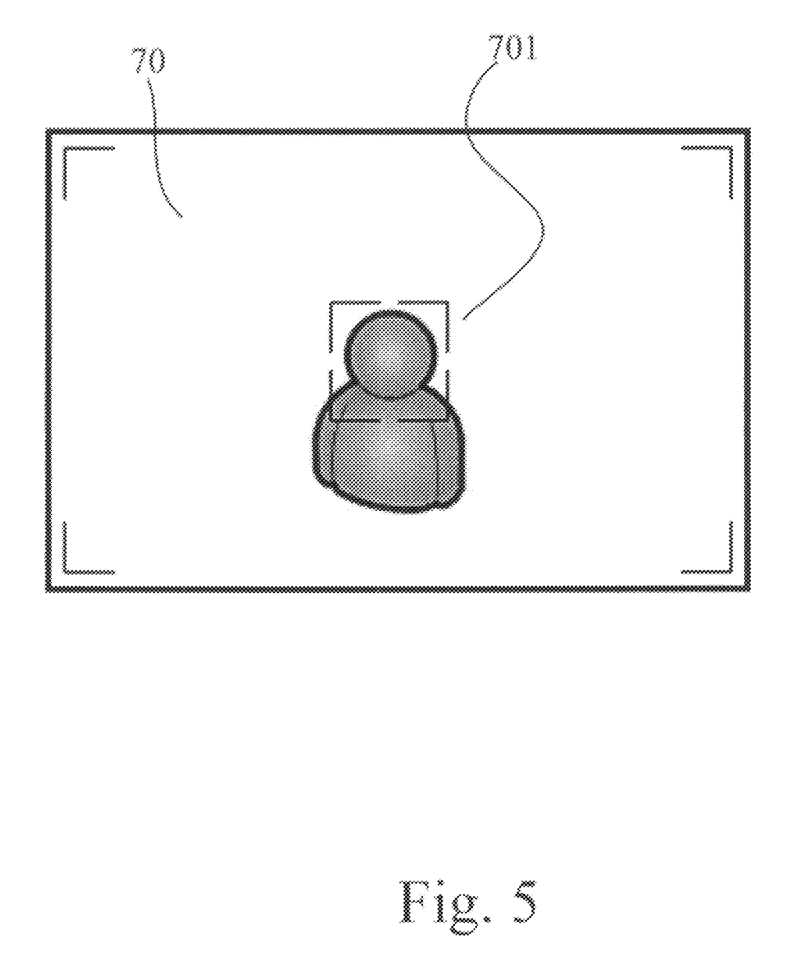
FIG. 5 further illustrates a display screen of the camera for the present invention.

Accordingly, the present invention could be executed via a camera as shown in FIG. 4. It illustrates a camera for an auto depth-field capturing system according to the present invention. As shown in the FIG. 4, the digital camera 50 includes the above described system of the present invention. Furthermore, there is a camera lens with an image sensor 501 displaced on the digital camera 50. When a user partly pushes a shutter button 502 thereof, the digital camera 50 will begin to execute the process of capturing 3D images. The result could be displayed on the 2D or 3D screen (not shown in FIG. 5) of the digital camera 50. The digital camera 50 could be moved or rotated in several directions 60 for capturing more images. When the user has satisfied the result, the user could completely push the shutter button to finish taking 3D images, and the result will be outputted or stored. FIG. 5 further illustrates a display screen of the camera for the present invention. The display screen 70 could further include a marked region 701 to define a focus region as the most important target for performing the capturing process of the present invention.

In accordance with the aspect of the above system, the present invention further provides an auto depth-field capturing method for a camera. Please refer to FIG. 6. It illustrates an auto depth-field capturing method for a camera according to the present invention. According to the FIG. 3 and FIG. 6, the method includes the steps of a) taking plural images via a camera lens 401, as shown in the procedure S601, wherein the plural images are stored temporarily in a frame buffer 413; b) estimating plural epipolar data of the plural images via an epipolar estimation module 411 for obtaining a fundamental matrix, as shown in the procedure S602; c) estimating a location data in response to the plural epipolar data and the fundamental matrix via a camera extrinsic parameter estimation module 412, as shown in the procedure S603; d) rectifying the plural images corresponding to plural epipolar data via an image rectification module 42 for obtaining plural rectified images, as shown in the procedure S604; e) calculating the location data via a disparity estimation module 43 for obtaining disparity vectors of the rectified images, as shown in the procedure S605; f) obtaining a depth in response to the disparity vectors and the location data via a disparity to depth conversion module 44, as shown in the procedure S606; and g) painting a 3D image in correspondence with the depth via a depth image painting module 45, as shown in the procedure S607.

Figure 6:
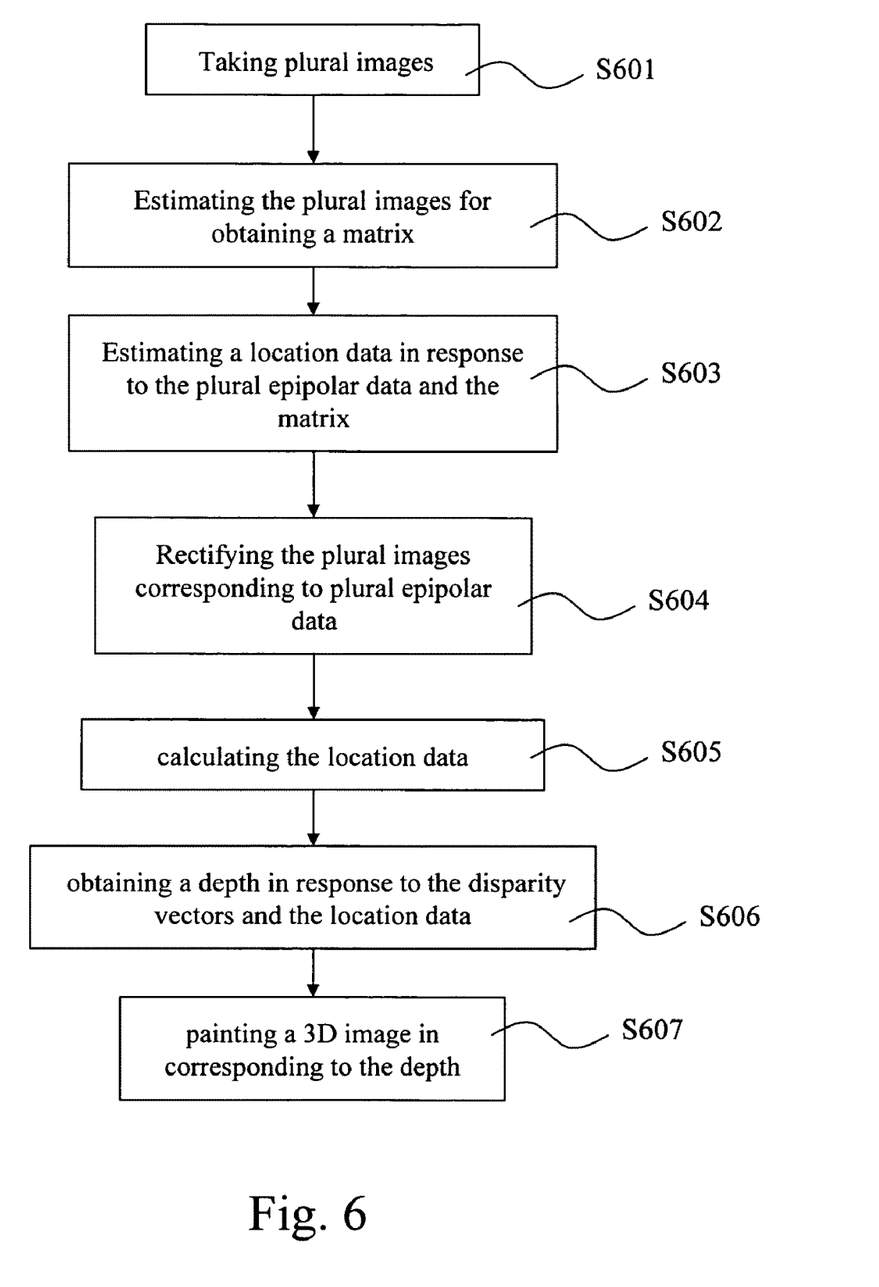
FIG. 6 illustrates an auto depth-field capturing method for a camera according to the present invention.

In practice, the plural images are taken from the camera at different positions respectively. After at least two images are taken via the camera lens 401, the image will be stored into the frame buffer 413 temporarily. The images stored in the images buffer 413 are introduced to the epipolar estimation module 411 of the camera calibration device 41 in turn. In this embodiment, the plural epipolar data are plural epipolar lines and epipolar points. The epipolar estimation module 411 produces a fundamental matrix in response to the plural epipolar lines and epipolar points by means of tracing algorithm, wherein the fundamental matrix includes a relative motion vector and a relative direction vector between at least two of the plural images. Accordingly, the method of the present invention could achieve the purpose of automatically obtaining object depth without change of the camera itself, thereby facilitating user to take stereo image.

In conclusion, the present invention provides an auto depth-field capturing system of a camera for obtaining object depth through digital signal processing. It provides disparity vectors and camera extrinsic parameters for obtaining the depth from a disparity to depth conversion module, simplifies the entire structure and process, and is capable of achieving the purpose of automatically obtaining object depth without change of the camera itself, thereby facilitating user to take 3D image. It can also rectify those drawbacks of the prior art and solve the above problems.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. An auto depth-field capturing system for a camera comprising:

a camera lens for taking plural images;

a camera calibration device including an epipolar estimation module for estimating plural epipolar data of said plural images, and a camera extrinsic parameter estimation module for estimating a location data;

at least a frame buffer for storing said plural images temporarily;

an image rectification module for rectifying said plural images corresponding to said plural epipolar data and obtaining plural rectified images;

a disparity estimation module connected with said camera calibration device and said image rectification module for receiving said location data and obtaining disparity vectors of said rectified images;

a disparity to depth conversion module for obtaining a depth in response to said disparity vectors and said location data; and a depth image painting module for painting a 3D image in correspondence with said depth.

2. The auto depth-field capturing system according to claim 1, wherein said plural images are taken from said camera at different positions.

3. The auto depth-field capturing system according to claim 1, wherein said plural epipolar data are plural epipolar lines and epipolar points.

4. The auto depth-field capturing system according to claim 3, wherein said epipolar estimation module further produces a matrix in response to said plural epipolar lines and epipolar points by means of tracing algorithm.

5. The auto depth-field capturing system according to claim 4, wherein said matrix comprises a relative motion vector and a relative direction vector between at least two of said plural images.

6. The auto depth-field capturing system according to claim 1, wherein said location data is 3D position and angle of said camera.

7. An auto depth-field capturing method for a camera comprising the steps of:
   a) taking plural images;
   b) estimating plural epipolar data of said plural images for obtaining a matrix;
   c) estimating a location data in response to said plural epipolar data and said matrix;
   d) rectifying said plural images corresponding to said plural epipolar data for obtaining plural rectified images;
   e) calculating said location data for obtaining disparity vectors of said rectified images;
   f) obtaining a depth in response to said disparity vectors and said location data; and
   g) painting a 3D image in correspondence with said depth.

8. The auto depth-field capturing method according to claim 7, wherein said step a) is executed via a camera lens.

9. The auto depth-field capturing method according to claim 7, wherein said plural images are taken from said camera at different positions.

10. The auto depth-field capturing method according to claim 7, wherein said step b) is executed via an epipolar estimation module.

11. The auto depth-field capturing method according to claim 7, wherein said plural epipolar data are plural epipolar lines and epipolar points of said plural images.

12. The auto depth-field capturing method according to claim 11, wherein said fundamental matrix is obtained in response to said plural epipolar lines and epipolar points by means of tracing algorithm.

13. The auto depth-field capturing method according to claim 7, wherein the said matrix comprises a relative motion vector and a relative direction vector between at least two of said plural images.

14. The auto depth-field capturing method according to claim 7, wherein said step c) is executed via a camera extrinsic parameter estimation module.

15. The auto depth-field capturing method according to claim 7, wherein said location data is 3D position and angle of said camera.

16. The auto depth-field capturing method according to claim 7, wherein said step d) is executed via an image rectification module.

17. The auto depth-field capturing method according to claim 7, wherein said step e) is executed via a disparity estimation module.

18. The auto depth-field capturing method according to claim 7, wherein said step f) is executed via a disparity to depth conversion module.

19. The auto depth-field capturing method according to claim 7, wherein said step g) is executed via a depth image painting module.

20. The auto depth-field capturing method according to claim 7, further comprising step of b1) providing at least a frame buffer for storing said plural images temporarily.

* * * * *